US008538153B2

(12) United States Patent
Flagg et al.

(10) Patent No.: US 8,538,153 B2
(45) Date of Patent: *Sep. 17, 2013

(54) SYSTEM AND METHOD FOR ENABLING MEANINGFUL INTERACTION WITH VIDEO BASED CHARACTERS AND OBJECTS

(75) Inventors: Matthew Flagg, Atlanta, GA (US);
Greg Roberts, Alpharetta, GA (US)

(73) Assignee: PlayVision Labs, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/243,486

(22) Filed: Sep. 23, 2011

(65) Prior Publication Data
US 2012/0033856 A1 Feb. 9, 2012

Related U.S. Application Data

(63) Continuation of application No. 11/959,370, filed on Dec. 18, 2007, now Pat. No. 8,055,073.

(60) Provisional application No. 60/875,666, filed on Dec. 19, 2006.

(51) Int. Cl.
*G06K 9/34* (2006.01)
*G06K 9/00* (2006.01)
*G06K 9/36* (2006.01)

(52) U.S. Cl.
USPC .......................................... 382/173; 382/190

(58) Field of Classification Search
USPC ................. 382/154, 164, 173, 174, 190, 224, 382/254, 266, 274, 282; 348/371, 578, 584, 348/586, 590, 593, E5.09; 345/420, 426, 345/592, 629, 634, 640, 960
See application file for complete search history.

(56) References Cited

U.S. PATENT DOCUMENTS

| | | | | |
|---|---|---|---|---|
| 6,667,774 | B2 * | 12/2003 | Berman et al. | 348/584 |
| 6,791,542 | B2 | 9/2004 | Matusik et al. | |
| 6,803,910 | B2 * | 10/2004 | Pfister et al. | 345/420 |
| 7,436,403 | B2 * | 10/2008 | Debevec | 345/426 |
| 7,599,555 | B2 * | 10/2009 | McGuire et al. | 382/173 |
| 7,609,327 | B2 * | 10/2009 | Matusik | 348/591 |
| 7,609,888 | B2 * | 10/2009 | Sun et al. | 382/173 |
| 7,633,511 | B2 * | 12/2009 | Shum et al. | 345/628 |
| 7,633,518 | B2 * | 12/2009 | Beevor et al. | 348/156 |
| 7,667,774 | B2 | 2/2010 | Murakami | |
| 7,680,342 | B2 * | 3/2010 | Steinberg et al. | 382/224 |
| 7,692,664 | B2 * | 4/2010 | Weiss et al. | 345/592 |
| 8,055,073 | B1 * | 11/2011 | Flagg et al. | 382/173 |
| 2006/0193509 | A1 * | 8/2006 | Criminisi et al. | 382/154 |

\* cited by examiner

*Primary Examiner* — Amir Alavi
(74) *Attorney, Agent, or Firm* — Clements Bernard PLLC; Lawrence A. Baratta, Jr.; Christopher L. Bernard

(57) ABSTRACT

The present disclosure provides a system and method for enabling meaningful body-to-body interaction with virtual video-based characters or objects in an interactive imaging environment including: capturing a corpus of video-based interaction data, processing the captured video using a segmentation process that corresponds to the capture setup in order to generate binary video data, labeling the corpus by assigning a description to clips of silhouette video, processing the labeled corpus of silhouette motion data to extract horizontal and vertical projection histograms for each frame of silhouette data, and estimating the motion state automatically from each frame of segmentation data using the processed model. Virtual characters or objects are represented using video captured from video-based motion, thereby creating the illusion of real characters or objects in an interactive imaging experience.

20 Claims, 3 Drawing Sheets

SYSTEM AND METHOD FOR ENABLING MEANINGFUL INTERACTION WITH VIDEO BASED CHARACTERS AND OBJECTS

CROSS-REFERENCE TO RELATED APPLICATION

This application is a continuation of U.S. Patent Application Serial No. 11/959,370 filed Dec 19, 2007, U.S. Pat No. 8,055,073 and entitled "SYSTEM AND METHOD FOR ENABLING MEANINGFUL BODY-TO-BODY INTERACTION WITH VIRTUAL SHADOW-BASED CHARACTERS" the contents of which are incorporated in full by reference herein. This application claims the benefit of priority of U.S. Provisional Application No. 60/875,666 filed Dec 19, 2006 and entitled "SYSTEM AND METHOD FOR ENABLING MEANINGFUL BODY-TO-BODY INTERACTION WITH VIRTUAL SHADOW-BASED CHARACTERS" the contents of which are incorporated in full by reference herein.

FIELD OF THE INVENTION

The present invention relates generally to the fields of interactive imaging, virtual environments, and markerless motion capture. More specifically, the present invention relates to a system and method for enabling meaningful interaction with video based characters or objects in an interactive imaging environment.

BACKGROUND OF THE INVENTION

An interactive imaging experience includes an environment in which an interactive display is affected by the motion of human bodies, or the like. A camera, or set of cameras, detects a number of features of human bodies or other objects disposed before the camera, such as their silhouettes, hands, head, and direction of motion, and determines how these features geometrically relate to the visual display. For example, a user interacting before a front-projected display casts a shadow on an optional display medium such as a projection screen, or the like. The interactive imaging system is capable of aligning the camera's detection of the silhouette of the human body with the shadow of the human body. This geometric alignment creates a natural mapping for controlling elements in the visual display. Persons of all ages can likely recall an experience of playing with their shadows and can thus understand that their motion in front of a source of bright light will produce a shadow whose motion behaves exactly as expected. This experience is capitalized upon in an interactive imaging experience.

Body motion capture is the analysis of a body in movement whereby the process includes recording a motion event and translating it into mathematical terms. Motion capture technologies that exist in the prior art include electromechanical, electromagnetic, and optical tracking systems. The electromechanical systems require the user to wear a bodysuit containing measuring devices at fixed points. The electromagnetic systems approach requires electromagnetic sensors to be worn upon a user body at specific locations. The optical motion capture technique uses multiple cameras and requires markers attached at various body locations of the user. Each of these approaches requires some sort of body suit and/or markers to be placed on a user's body. In addition to this need for specialized equipment, the equipment itself is expensive, restrictive, and limiting to the user. Markerless motion capture, on the other hand, allows motion capture without the need for such equipment and markers attached to a body.

There are many uses for motion capture technologies. Key among those is the use of human motion capture for use in computer-generated virtual characters or objects, such as virtual reality interactions for example. Such a use often requires various recordings of human motion, action, and interaction and then processing and using that data in virtual characters or objects.

Automatic interaction of virtual characters with real persons in a machine-sensed environment is now a very popular form of entertainment. For example, in *Dance Dance Revolution®* (DDR), (see http://www.konami.com/, generally, and see ht tp://www.konamistyle.com/b2c_kden/b2c/init.do, specifically), a popular video game produced by Konami, three-dimensional virtual characters or objects or two-dimensional cartoon characters dance along with players in the context of a song with beat-driven motion instructions. The game includes a dance pad with arrow panels, providing instructions to a player as to whether to move up, down, left, or right.

An example of virtual characters that respond to a player instead of mimicking the player is the EyeToy® by Nam Tai (see http://www.us.playstation.com/eyetoy.aspx), a color digital camera device for the PlayStation2 by Sony. The Eye-Toy® device is similar to a web camera and uses computer vision to process images taken by the camera. In one Eye-Toy® boxing game, players "box" with a virtual character that reacts to punches and "hits" back. EyeToy® incorporates a form of gesture recognition in order to manipulate the virtual boxer in response to punches thrown by the real player.

While *Dance Dance Revolution®* and the EyeToy® are compelling for entertaining people through body-to-body interactions, each has an obvious synthetic presence. The virtual bodies in each game could not be mistaken for real characters in the real world. Furthermore, the vision-based (as opposed to button-control-based DDR®) EyeToy® boxing game cannot react to real human motion in a convincing way due to deficiencies with the degrees of freedom and the overall level of detail in the captured motion of the player.

While these patents and other previous systems and methods have attempted to solve the above mentioned problems, none have provided a system and method for enabling meaningful body-to-body interaction with virtual video-based characters or objects. Thus, a need exists for such a system and method.

BRIEF SUMMARY OF THE INVENTION

In various embodiments, the present invention provides a system and method for enabling meaningful body-to-body interaction with virtual video-based characters or objects in an interactive imaging environment. The method includes the use of a corpus of captured body-to-body interactions for creating an interactive imaging experience where captured human video data is replayed in response to specific human motions. The choice of video data to replay in response to a given input motion helps create the illusion of interaction with a virtual character or object in a meaningful and visually plausible way. This method further includes the use of pattern recognition techniques in a manner similar to voice recognition in order to overcome inherent difficulties with detailed markerless motion capture.

In one exemplary embodiment of the present invention, a method for enabling meaningful body-to-body interaction with virtual video-based characters or objects in an interactive imaging environment is described including: capturing a corpus of video-based interaction data, processing the captured video using a segmentation process that corresponds to the capture setup in order to generate binary video data, labeling the corpus by assigning a meaning to clips of silhouette input and output video, processing the labeled corpus of silhouette motion data to extract horizontal and vertical projection histograms for each frame of silhouette data, and estimating the motion state automatically from each live frame of segmentation data using the processed model.

In another exemplary embodiment of the present invention, virtual characters or objects, displayed using previously recorded video, are represented using actual video captured from real motion, as opposed to rendered in three dimensional space, thereby creating the illusion of real human figures in the context of an interactive imaging experience.

In yet another exemplary embodiment of the present invention, meaningful responses to input human motion are enabled by recognizing patterns of live human motion and establishing correspondences between these recognized patterns and the appropriate recorded motion responses.

In yet another exemplary embodiment of the present invention, the processing of the labeled corpus of silhouette motion data to extract horizontal and vertical projection histograms for each frame of silhouette data further includes: constructing a state transition probability table, tuning the state transition probability table, assigning a plurality of probabilities to a plurality of state transitions from one state to another state in the captured video, wherein the state transition table is used to help estimate an unobserved motion state during the live playback.

In still another exemplary embodiment of the present invention, a system for enabling body-to-body interaction with video-based characters or objects in an interactive imaging environment is described that includes an image generator operable for creating or projecting an image, a background surface conducive to segmentation, one or more illumination energy devices operable for flooding a field of view in front of the created or projected image with illumination energy, an infrared image sensor operable for detecting the illumination energy, a video image sensor, a computer vision engine operable for detecting one or more users in the field of view in front of the created or projected image and segmenting the one or more users and a background, thereby providing a form of markerless motion capture, a computer interaction engine operable for inserting an abstraction related to the one or more users and/or the background, and a computer rendering engine operable for modifying the created or projected image in response to the presence and/or motion of the one or more users, thereby providing user interaction with the created or projected image in a virtual environment.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to various drawings, in which like reference numerals denote like apparatus components and/or method steps, and in which.

DETAILED DESCRIPTION OF THE INVENTION

Figure 1:
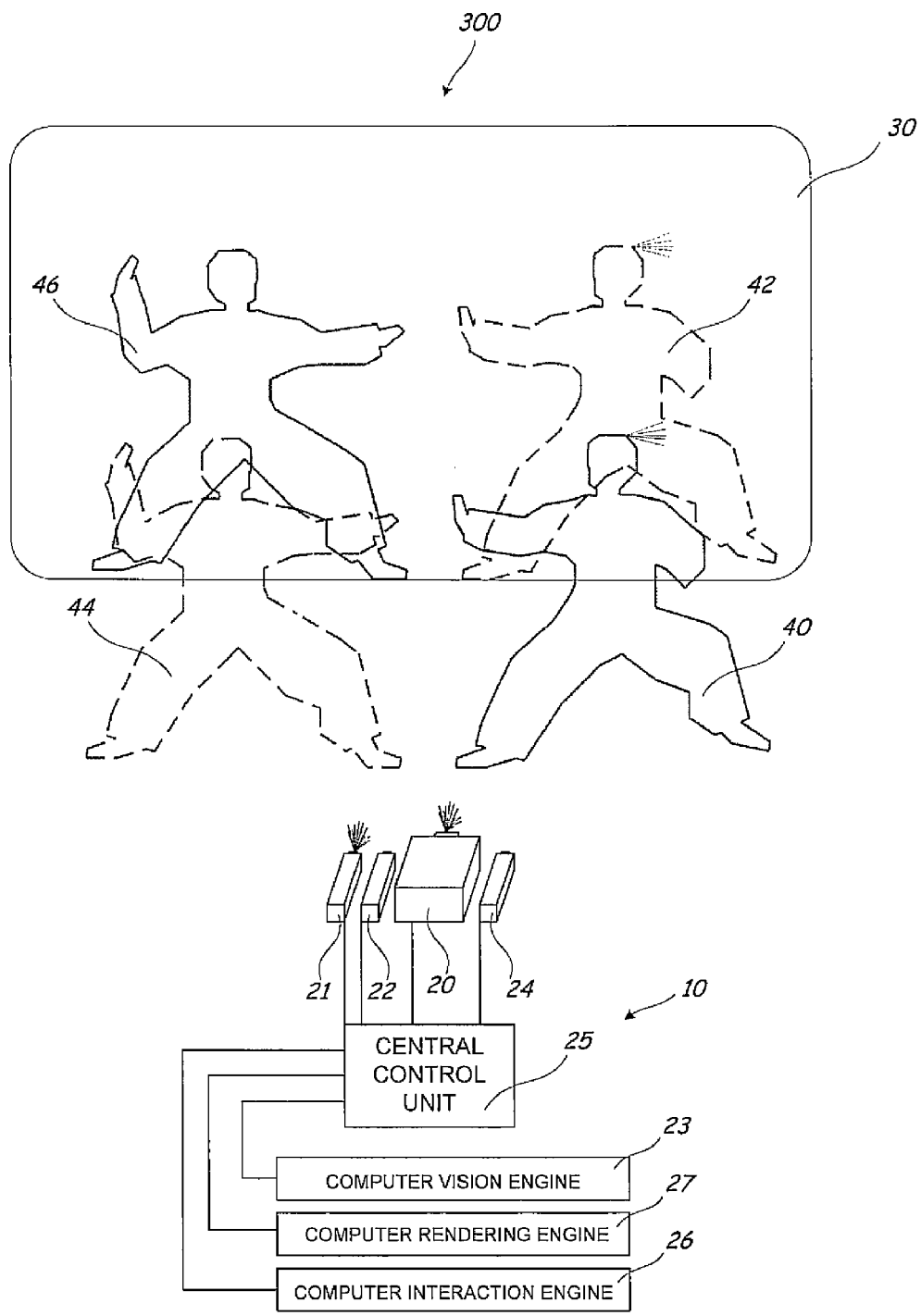
FIG. 1 is a schematic diagram illustrating one exemplary embodiment of the system and method for enabling meaningful body-to-body interaction with video-based characters or objects of the present invention.

Before describing the disclosed embodiments of the present invention in detail, it is to be understood that the invention is not limited in its application to the details of the particular arrangement shown since the invention is capable of other embodiments. Also, the terminology used herein is for the purpose of description and not of limitation.

In one exemplary embodiment of the present invention, a method for enabling meaningful body-to-body interaction with virtual video based characters or objects in an interactive imaging environment is described. This method is useful in an interactive imaging system 10. Such an interactive imaging system 10 includes an image generator 20 operable for creating or projecting an image. The image generator 20 is, for example, a visible light projector or the like. Images that may be projected include, but are not limited to, calibration line-up silhouettes, waves, vapor trails, pool balls, etc.

The interactive imaging system 10 also includes a background surface conducive for alpha matte construction, such as a blue screen or green screen. The blue or green screen is only necessary for capturing the corpus of video data. The blue or green screen is not needed during runtime interaction. Optionally, the interactive imaging system 10 also includes a display medium 32 operable for receiving and displaying the created or projected image. The display medium 32 may consist of a two or three-dimensional projection screen, a wall or other flat surface, a television screen, a plasma screen, a rear-projection system, a hyper-bright OLED surface (possibly sprayed-on as a flexible substrate and onto the surface of which images are digitally driven), or the like. In general, the interactive imaging system 10 is display agnostic.

The interactive imaging system 10 further includes one or more illumination energy devices 21 operable for flooding a field of view in front of the created or projected image with illumination energy. For example, the one or more illumination energy devices 21 may consist of one or more infrared lights operable for flooding the field of view in front of the created or projected image with infrared light of a wavelength of between about 700 nm and about 10,000 nm. Preferably, the infrared light consists of near-infrared light of a wavelength of between about 700 nm and about 1,100 nm. Optionally, the infrared light consists of structured (patterned) infrared light or structured (patterned) and strobed infrared light, produced via light-emitting diodes or the like. In an alternative exemplary embodiment of the present invention, the image generator 20 and the one or more illumination energy devices 21 are integrally formed and utilize a common illumination energy source.

The interactive imaging system 10 still further includes an image sensor 24 operable for detecting the illumination energy which is in the infrared spectrum. The image sensor 24 is, for example, an infrared-pass filtered camera, or the like. In an alternative exemplary embodiment of the present invention, the image generator 20 and the image sensor 24 are integrally formed. Optionally, an optical filter is coupled with the image sensor 24 and is operable for filtering out illumination energy, which is in the infrared spectrum, of a predetermined wavelength or wavelength range, such as, for example, visible light.

The interactive imaging system 10 still further includes a computer vision engine 23. The computer vision engine 23 is operable for detecting one or more user 40, 44, 48 in the field of view in front of the created or projected image and segmenting the one or more users 40, 44, 48 and a background, thereby providing a form of markerless motion capture. The computer vision engine 23 gives the interactive imaging system 10 "sight" and provides an abstraction of the user 40, 44, 48 and the background. In this manner, the one users 40, 44, 48 and the background are separated and recognized. When properly implemented, the number of users 40, 44, 48 can be determined, even if there is overlap, and heads and hands may be tracked. Preferably, all of this takes place in real time, i.e. between about $1/60^{th}$ and $1/130^{th}$ of a second. Optionally, the computer vision engine 23 is operable for detecting a user 40, 44, 48 in the field of view in front of the created or projected image and segmenting the one or more users 40, 44, 48 and the background, thereby providing a form of markerless motion capture.

The interactive imaging system 10 still further includes a computer interaction engine 26 operable for inserting an abstraction related to the one or more user 40, 44, 48 and/or the background. The computer interaction engine 26 understands interactions between the one or more user 40, 44, 48 and/or the background and creates audio/visual signals in response to them. In this manner, the computer interaction engine 26 connects the computer vision engine 23 and a computer rendering engine 27 operable for modifying the created or projected image in response to the presence and/or motion of the one or more user 40, 44, 48, thereby providing user interaction with the created or projected image in a virtual environment, Again, all of this takes place in real time, i.e. between about $1/60^{th}$ and $1/130^{th}$ of a second.

The interactive imaging system 10 still further includes a video camera 22 operable to record data in the video capture of body actions. The video camera 22 is, for example, a camera capable of recording body motions before a surface conducive to alpha matte construction. This captured video data is then segmented in time and labeled.

The interactive imaging system 10 still further includes a central control unit 25 operable for controlling and coordinating the operation of all of the other components of the interactive imaging system 10. The central control unit 25 directly connects to the computer interaction engine 26, computer vision engine 23, computer rendering engine 27, image sensor 24, image generator 20, and the illumination energy devices 21.

The hardware environment has been described allowing the interactive imaging system 10, in which the method for enabling meaningful body-to-body interaction with virtual video-based characters or objects 300 is operable. Using such an interactive imaging system 10, the method 300 is initiated with the steps discussed hereinafter. Although this system and method are useful under many scenarios and have numerous applications, an example pertaining to Kung Fu, a popular form of martial arts, will be used throughout to illustrate how this method 300 prepares applications for use in an interactive imaging system 10. The use of Kung Fu is not meant to be a limitation, but is simply used as an exemplary embodiment.

A corpus of shadow interaction data is captured 310. In the Kung Fu example, a "player" or "fighter" of average skill level is positioned in front of a surface that is conducive to alpha matte construction 30, such as a blue screen or green screen. This player, a real person, is represented as an actual amateur 44 in FIG. 1 and is placed before the surface that is conducive to alpha matte construction 30 along with a Kung Fu fighter, also a real person and preferably an actual expert 40, whose motions and silhouette appearance will represent the virtual fighter during live playtime or runtime in an interactive imaging system 10 application. The actual amateur 44 and the actual expert 40 each cast a shadow, the amateur shadow 46 and the expert shadow 42, respectively. (Segmentation is a technique concerned with splitting up an image, or visual display, into segments or regions, each segment or region holding properties distinct from the areas adjacent to it. This is often done using a binary mask, representing the presence of a foreground object in front of the visual display surface.) In this session of collecting shadow interaction data, the actual amateur 44 and the actual expert 40 will fight, or spar, in a manner that fully explores the span of typical motions evident in Kung Fu.

Kung Fu moves such as kicks, punches, dodges, and reactions should all be captured in a number of different body configurations (with expert on right side and average on left and vice versa, for example). If a very large amount of data (more than 1 hour, for example) is captured, the likelihood of finding a match to online input motion is high because there are more possibilities. If the dataset is too large, however, real-time recognition becomes difficult because it is computationally expensive to search the space of possibilities. On the other hand, if too small an amount of data is captured then the recognized patterns may often erroneously correspond to the actual input motion, resulting in a set of virtual character responses that are unrealistic or unbelievable (for example, a fall in response to a duck).

The captured video 22 is processed using an alpha matte construction process that corresponds to the capture setup in order to generate alpha matte video data. If the video was collected in front of a green screen, for example, chroma-key software such as Ultimatte or Primatte for Adobe After Effects, is used to input the raw video and output alpha matte video. The video captured from the infrared-pass image sensor 24 is also processed 320 by inputting raw video, segmenting the video to generate binary segmented video and outputting binary segmented video.

The corpus is manually labeled by a human to assign a meaning to the clips of silhouette input and output video 330. Input is the motion of the actual amateur 44 and output is the motion of the actual expert 40. Labeling involves assigning integer indices, which correspond to a table of known motion states, to ranges of frames in the set of videos. For example, frames 100-160 may be labeled number 47 which index into the state table for state "punch A". Multiple frame ranges may correspond to the same motion states.

The labeled corpus of silhouette motion data is processed to extract horizontal and vertical projection histograms for each frame of silhouette data 340. Horizontal and vertical projection histograms are the sum of white pixels in the binary image projected onto the vertical and horizontal axis. Additionally, a state transition probability table is constructed and manually tuned by human intervention to assign a probability that a state transitions from one state A to another B in the captured data. This can be automatically initialized by analyzing the frequency of transitions from one state to all others and dividing by the maximum frequency or the sum of all frequencies. This state transition table is used to help estimate the hidden (or unobserved) motion state during the live playback. A Markov Model is essentially a set of states and a table that defines the transitions from state to state alone with a probability of the transition.

The motion state is automatically estimated from each live frame of segmentation data using the processed model 350. The motion state is the vertical and horizontal projection histogram for a series of frames that comprise the motion's duration. For each binary frame of data, which is assumed to be segmented from a live camera, vertical and horizontal projections, estimates for the states of all previous motion frames and the learned model are all used to estimate the current unknown motion state. After the motion state is estimated, the corresponding expert Kung Fu reaction is positioned on the screen and replayed in reaction to the estimated input motion state.

Referring now to FIG. 1, a schematic diagram of the method for enabling meaningful body-to-body interaction with virtual video-based characters or objects 300 is shown, Two actors, an actual amateur 44 and an actual expert 40, both actual persons, are located in front on a surface conducive to segmentation 30, such as a blue screen or green screen. Additionally, the expert shadow 42 and the amateur shadow 46 are shown. The interactive imaging system 10 is shown. The video camera 22 captures and records an amount of video data to later be processed using a segmentation technique.

Figure 2:
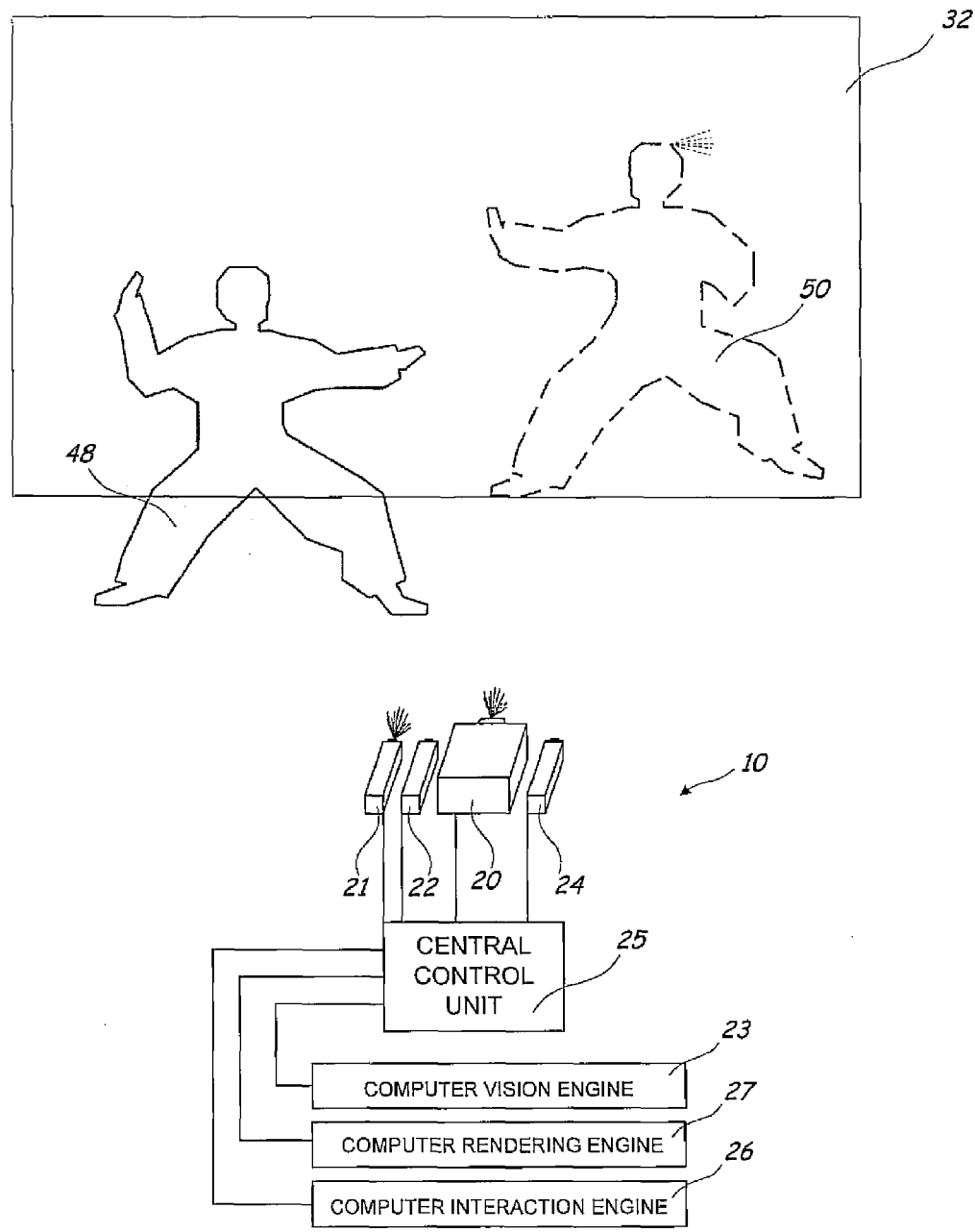
FIG. 2 is a schematic diagram illustrating one exemplary embodiment of the system and method for enabling meaningful body-to-body interaction with video-based characters or objects of the present invention.

Referring now to FIG. 2, a schematic diagram of the method for enabling meaningful body-to-body interaction with video-based characters or objects 300 is shown. Two actors, an actual game player 48, a real person, and a video based character 50, a projected moving image from the image generator 20, are shown. The interactive imaging system 10 is also shown. The video based character 50 is a virtual video-based character, thereby creating the illusion of a real human in the context of the interactive imaging experience. Meaningful responses by the video based character 50, to the input human motion by the actual game player 48, are enabled by recognizing patterns of live human motion and establishing correspondences between these recognized patterns and the appropriate recorded motion responses.

Figure 3:
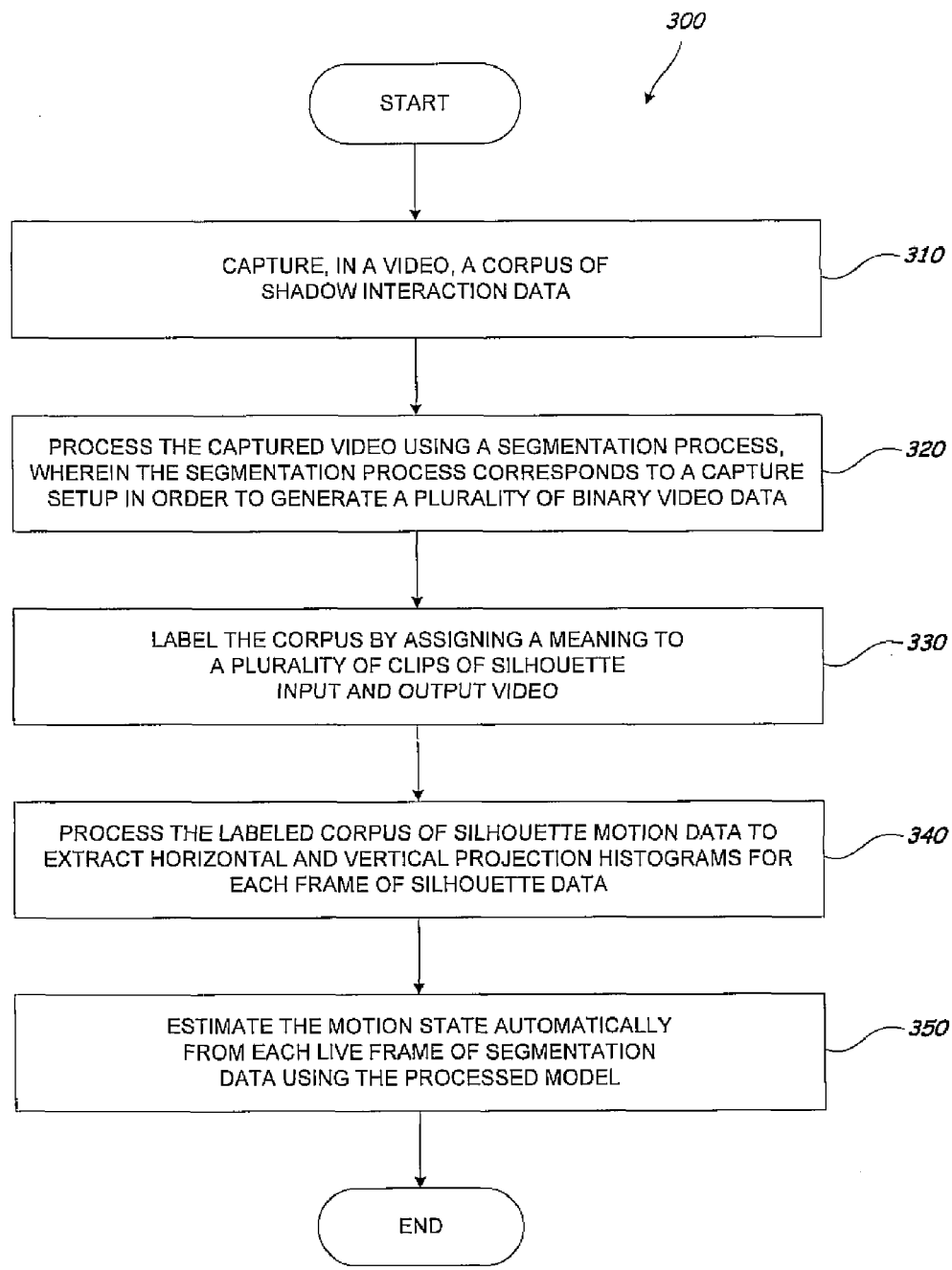
FIG. 3 is a flow chart illustrating one exemplary embodiment of the method for enabling meaningful body-to-body interaction with video-based characters or objects of the present invention.

Referring now to FIG. 3, a flowchart diagram of the method for enabling meaningful body-to-body interaction with virtual video-based characters or objects 300 is shown. The method flowchart illustrates, in order, capturing a corpus of interaction data 310, processing the captured video 22 to construct alpha matte video data, processing the captured video 24 using a segmentation process that corresponds to the capture setup in order to generate binary video data 320, labeling the corpus by assigning a meaning to clips of silhouette input and output video 330, processing the labeled corpus of silhouette motion data to extract horizontal and vertical projection histograms for each frame of silhouette data 340, and estimating the motion state automatically from each live frame of segmentation data using the processed model 350.

The method 300 is initiated with the estimation of the motion state that is accomplished with one or more users 40, 44, 48 having no previous motion state. One exemplary approach to initializing the system is to allow the virtual video based characters to make the first move. During the capture of the corpus of video data, or training data, a number of motion responses to this first move are observed. This particular set of motion responses is assumed to be sufficiently large, for example 10 motion responses, such that the observed response to the first move will most likely match the set of stored examples. Therefore, using a method of score computation described below, the system can pick from the set of responses recorded and then playback the appropriate expert response. Put another way, the sequence is will start with the expert's turn, then the amateur's turn, then expert's turn, then amateur's turn and so on, generally following this particular sequence.

Once the sequence of turns has commenced, the system can better predict the amateur motion to the set of training motions by maintaining a probability distribution of motion. This probability distribution is represented using the Markov Model. For example, a set of training clips have been tagged with a label such as Kick A, Punch A, etc. There may be many examples of video sequences that have been captured that lead to the same motion. The Markov Model includes nodes for each label of motion and arrows from nodes to other nodes or to itself with numbers associated with the probability of transitioning from one node to another. This Markov Model is a representation frequently used in speech recognition software. Therefore, the meaningfulness of the expert video based character's 50 responses may be represented by their probability stored in the Markov Model, determining the motion estimate.

A motion estimate is similar to a video clip. Rather than representing the video clip as a series of images in time, the video clip is transformed into a more compressed representation. This representation is known as the vertical and horizontal projection histogram over time. The process of converting a video clip into vertical and horizontal histograms includes:

1) segmenting the video into binary video where pixels become either one or zero; and
2) counting the number of pixels in each row for each frame of video to generate the vertical projection histogram.

This is accomplished by counting the number of foreground (white or 1) pixels and storing these pixels in a vector, for each frame in time and for each row in the frame. This results in a vector of length (the height of the image) or 240 with each value in the vector being the sum of white pixels for the corresponding row. An exemplary example is an image that is 4×3 pixels (a 4×3 matrix). The vertical projection histogram could be [1 2 3 0]. The same process may be repeated for generating the horizontal projection histogram but for the columns of the image rather than the rows. If these two vectors are stacked together (horizontal and vertical), one vector is obtained. A matrix may then be generated by assigning each vector to a column corresponding to a point in time. The resulting matrix would consist of a number of rows including width plus height, and a number or columns including the number of frames in the video clip for the specific motion. This resulting matrix serves as the representation of the video clip.

In order to find a matrix in the large collection of matrices that compose the corpus of data, a new matrix must be compared with the corpus of matrices. The new matrix is constructed from past frames collected by the image sensor 24, designated as N frames. The matrices may be compared using cross correlation. A score or cost is associated between the current matrix and all matrices in the training data, which consists of the corpus converted into a horizontal and vertical projection histograms. One method of computing this score or cost is cross correlation, but other techniques may also be used to compare the matrices. The matrix from the training data with the lowest cost is selected as the correct motion estimate associated with the past N frames captured by the live image sensor.

When the corpus of data was captured, an expert 40 and amateur 44 were in the field of view of both the image sensor 24 and the video camera 22. The motion estimate, now known at this point, is compared with the motion estimates for the user 40, 44, 48 and this is used to extract the appropriate expert video clip. The expert motion that occurred during and immediately after the amateur's motion is what is actually played by the computer rendering engine 27.

A video based character 50 is a video-based representation of a character. The process for constructing a virtual video based character 50 entails recording a video of the character, such as a Kung Fu fighter as used as an example, in front of a green or blue screen. Software is applied to extract the alpha matte of the video. The alpha matte video and corresponding color video comprise the video-based representation of the video based character 50.

The meaningfulness aspect of a virtual video based character depends upon the positioning of the video based character 50 with respect to the one or more users 40, 44, 48. The interaction must be meaningful, meaning possessing a certain level of reality that would keep the one or more users 40, 44, 48 engaged. If a video-based Kung Fu fighter, or other video based character 50, throws a punch 20 feet away from the one or more users 40, 44, 48, it would seem meaningless. To be meaningful, the punch should be in very close proximity to the one or more users 40, 44, 48.

The retrieved video clip is positioned on the screen as a function of the position of the one or more users 40, 44, 48. An example of this function is f(x)=x+n, where x is the position of the one or more users 40, 44, 48 (in x, y coordinates) and n is the width in pixels of the virtual video based character 50 at the current point in time. The user could make a design choice to the system 10 for creating such a positioning function, depending upon the desired use. For example, choosing between a style of interaction, such as fighting versus mimicking.

The computer rendering engine 27 is similar to a video playback system. If a set of videos is stored within the computer rendering engine 27, then a naive version of the system 10 would simply play one clip after another. When a clip ends, the other clip begins. However, it will most likely be readily apparent that a jump or pop in the video would be noticeable. This is commonly known as a cut. For example, when there are scene changes in a movie, the viewer can typically detect a rapid change in the video. In the present invention, a practically seamless transition is preferred, wherein the user cannot tell where one clip ends and another clip begins. This is less noticeable than a cut. However, it still might be possible to detect the positions of a fighter's legs or arms shift during this cross-fade. Preferably, a cross-fade is performed to make a practically seamless transition to proved a meaningful interaction with video based characters or objects.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the invention and are intended to be covered by the following claims.

What is claimed is:

1. A method, comprising:
capturing interaction data with an imaging system;
processing the captured interaction data with a segmentation process, wherein the segmentation process generates binary video data, wherein the binary video data comprises silhouette motion data;
processing the silhouette motion data to extract horizontal and vertical projection histograms for each frame of the silhouette motion data; and
estimating a motion state automatically from each frame of segmentation data using the processed silhouette motion data.

2. The method of claim 1, further comprising:
displaying virtual video-based characters or objects using captured video from real motion to create an illusion of real human movement.

3. The method of claim 1, further comprising:
recognizing a plurality of patterns of live human motion and establishing correspondences between these recognized patterns of live human motion and the appropriate recorded motion responses.

4. The method of claim 1, wherein the captured interaction data comprises a predetermined number of motions low enough to avoid real-time recognition difficulty due to the computational expense of searching and high enough to avoid an inability to recognize patterns based on actual input motions from too small a dataset.

5. The method of claim 1, wherein the segmentation process is applied to the captured interaction data and outputs binary segmented video.

6. The method of claim 1, further comprising:
labeling the captured interaction data through assigning integer indexes thereto, which correspond to a table of known motion states and to ranges of frames in the input and output video.

7. The method of claim 1, wherein the horizontal and vertical projection histograms for each frame of silhouette data are a sum of white pixels in a binary image projected onto a vertical and horizontal axis.

8. The method of claim 1, further comprising:
constructing a state transition probability table.

9. The method of claim 8, further comprising:
tuning the state transition probability table.

10. The method of claim 8, further comprising:
assigning a plurality probabilities to a plurality of state transitions from one state to another state in the captured video.

11. The method of claim 8, wherein the state transition table is utilized to estimate an unobserved motion state during the live playback.

12. The method of claim 8, wherein the state transition table is part of a Markov Model, containing a set of states and a table that defines the transitions from state to state and a probability of the transition.

13. A method, comprising:
capturing a corpus of video-based interaction data;
processing, using a processor, the captured corpus of video-based interaction data using a segmentation process, wherein the segmentation process comprises a capture setup that generates binary video data comprising silhouette motion data;
labeling the corpus of video-based interaction data by assigning a description to the silhouette motion data;
processing the labeled silhouette motion data; and
estimating a motion state automatically using the processed and labeled silhouette motion data.

14. A system, comprising:
an interactive imaging system configured to:
capture interaction data with an imaging system;
process the captured interaction data with a segmentation process, wherein the segmentation process generates binary video data, wherein the binary video data comprises silhouette motion data;
process the silhouette motion data to extract horizontal and vertical projection histograms for each frame of the silhouette motion data; and
estimate a motion state automatically from each frame of segmentation data using the processed silhouette motion data.

15. The system of claim 14, wherein the interactive imaging system is further configured to:
display virtual video-based characters or objects using captured video from real motion to create an illusion of real human movement.

16. The system of claim 14, wherein the interactive imaging system is further configured to:
recognize a plurality of patterns of live human motion and establishing correspondences between these recognized patterns of live human motion and the appropriate recorded motion responses.

17. The system of claim 14, wherein the captured interaction data comprises a predetermined number of motions low enough to avoid real-time recognition difficulty due to the computational expense of searching and high enough to avoid an inability to recognize patterns based on actual input motions from too small a dataset.

18. The system of claim 14, wherein the segmentation process is applied to the captured interaction data and outputs binary segmented video.

19. The system of claim 14, wherein the interactive imaging system is further configured to:
label the captured interaction data through assigning integer indexes thereto, which correspond to a table of known motion states and to ranges of frames in the input and output video.

20. The system of claim 14, wherein the horizontal and vertical projection histograms for each frame of silhouette data are a sum of white pixels in a binary image projected onto a vertical and horizontal axis.

* * * * *